(12) United States Patent
Rahman (10) Patent No.: US 10,645,545 B1
(45) Date of Patent: May 5, 2020

(54) COMMUNICATION ANALYSIS MECHANISM AND METHODS

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 16/593,892

(22) Filed: Oct. 4, 2019

(51) Int. Cl.
*H04M 15/00* (2006.01)
*G06F 16/28* (2019.01)
*H04W 4/24* (2018.01)
*G06F 16/27* (2019.01)

(52) U.S. Cl.
CPC .............. *H04W 4/24* (2013.01); *G06F 16/27* (2019.01); *G06F 16/285* (2019.01); *H04M 15/43* (2013.01); *H04M 15/57* (2013.01); *H04M 2215/0164* (2013.01); *H04M 2215/20* (2013.01); *H04M 2215/32* (2013.01)

(58) Field of Classification Search
CPC ....... H04W 4/24; H04M 15/43; H04M 15/57; H04M 2215/0164; H04M 2215/32; H04M 2215/20; G06F 16/27; G06F 16/285
See application file for complete search history.

(56) References Cited

U.S. PATENT DOCUMENTS

| 7,463,878 | B2 * | 12/2008 | Kumar | G06Q 30/04 379/112.01 |
| 2010/0330987 | A1 * | 12/2010 | Lee | H04W 8/26 455/432.1 |
| 2011/0235791 | A1 * | 9/2011 | Ward | H04M 15/00 379/114.01 |

* cited by examiner

*Primary Examiner* — Joseph E Dean, Jr.
(74) *Attorney, Agent, or Firm* — Perkins Coie LLP (57) ABSTRACT

Systems and methods for characterizing communications in a network are disclosed. The method includes obtaining records from multiple sources within the network; correlating the records according to one or more attributes of the communications facilitated by the network; and calculating one or more detailed metrics based on the correlation.

20 Claims, 6 Drawing Sheets

| Originating Party | Terminating Party | Corresponding Percentage | Volume |
|---|---|---|---|
| Operator T | Operator T | ...% | ... |
| Operator T | Operator A | ...% | ... |
| Operator T | Operator V | ...% | ... |
| Operator T | Operator S | ...% | ... |
| Operator A | Operator C | ...% | ... |
| Operator V | Operator T | ...% | ... |
| Operator S | Operator T | ...% | ... |
| Operator C | Operator T | ...% | ... |
| Operator T | International Destination | ...% | ... |

COMMUNICATION ANALYSIS MECHANISM AND METHODS

BACKGROUND

Growth in computing technology has produced numerous new devices as well as new applications for new and existing devices. Advances in computing technology has also produced new communications methods and or protocols, such as Fourth Generation (4G) Long Term Evolution (LTE), Fifth Generation (5G) wireless communications standards, and/or wireless fidelity (WiFi) standards. However, such growth in computing technology has failed to reduce or simplify the load on communication networks. In addition to increasing number of devices and applications communicating over the networks, the networks are often required to be backwards compatible. Accordingly, the communication networks are also required to support an increasing number of communication mechanisms. When combined, such factors present rapidly growing number of communication paths/combinations (e.g., for communication standards, communicating devices, and/or communicating applications) and associated network issues.

BRIEF DESCRIPTION OF THE DRAWINGS

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

Communication networks are often configured to provide seamless communications between various types of devices. For example, a communication network can be configured to support or enable voice and/or data communications over wired connections and/or wireless connections. Accordingly, the communication network can simultaneously support various communication technologies/protocols. Some examples of communication technologies/protocols can include Second Generation (2G) protocols, Third Generation (3G) protocols, 4G protocols, LTE protocols, 5G protocols, telephony protocols (e.g., for landlines), TCP/IP, voice over IP (VoIP), etc. As a result, the communication network can be required to support or implement communications across a vast number of technology combinations.

However, since the technologies/protocols were developed at different times and/or are governed by different groups, information tracked and reported for the technologies/protocols can be different. In other words, no communication protocol currently provides a format or a requirement to report/track data necessary to describe data communications (e.g., voice calls) end-to-end. Additionally, end-to-end tracking of data communications can be more difficult for "off-network" communications that span across multiple networks (e.g., across different network providers, such as telephone companies, internet service providers, and/or wireless service providers).

In one or more embodiments of the current technology, a communication network and system can provide one or more metrics that represent in-network communications (e.g., communications between devices supported by the same service provider) and off-network communications, communications involving specific partner providers, and/or communications according to utilized technologies. As an illustrative example, the communication network can obtain communication records (e.g., call data records (CDRs)) from various different sources, such as from Mobile Switching Stations (MSSs) for 2G/3G communications, Telephony Application Servers (TASs) for 4G/WiFi communications, and/or Network Functions (NFs) for 5G communications. For a given service provider, the obtained records can represent communications to/from their customers. Accordingly, the communication network can analyze the obtained records according to a subscriber list to identify the in-network and off-network communications. The communication network can obtain the subscriber list from one or more subscription databases, such as Home Location Registers (HLRs) for 2G/3G subscribers, Home Subscriber Servers (HSSs) for 4G/WiFi communications, and/or Unified Data Repositories (UDR) for 5G subscribers. The communication network can use the analysis results to calculate metrics associated with in-network and off-network communications.

The communication network can further utilize the obtained communication records to identify communications that involved specific partner providers (e.g., other network providers). For example, the communication network can analyze the off-network communications according to records from bridge nodes that connect the communication network to other partner networks. Some examples of the bridge nodes can include Interconnection Border Control Functions (IBCFs) and/or Session Border Controllers (SBCs). The communication network can access the CDRs from the bridge nodes to identify the partner networks associated with the corresponding communications (e.g., according to a realm field within each of the records). The communication network can use the analysis results to calculate metrics associated with each partner network.

The communication network can further utilize the obtained communication records to identify communications that involved specific technologies. For example, the communication network can analyze the obtained CDRs according to source identifiers therein. The communication network can use the source identifiers to categorize the CDRs according to the technologies utilized to enable the communications.

The communication network can use the categorized results to calculate metrics associated with each communications technology. The calculated metrics can then be used to provide increased efficiency for the network. Moreover, the calculated metrics can improve efficiencies in analyzing and structuring/adjusting the network. Since the metrics can represent various consumer use patterns for the communication network, components and/or functions of the communication network can be configured or adjusted (e.g., statically and/or dynamically) based on the actual usage patterns. Accordingly, new or available resources can be utilized according to the real-time demand or projected demand (i.e., calculated based on the actual usage patterns) as represented by the calculated metrics. Further, the calculated metrics can be used to generate other commercial opportunities. For example, the partner network metric can be used to identify new business opportunities with other service providers. Also, the in-network and off-network metrics can be used to generate new subscriber plans that benefit the subscribers and the communication network.

In the following description, for the purposes of explanation, numerous specific details are set forth in order to provide a thorough understanding of implementations of the present technology. It will be apparent, however, to one skilled in the art that implementations of the present technology can be practiced without some of these specific details. Further, while the following description discusses voice communication (e.g., VoLTE, VoNR, and so on), it will be apparent to one skilled in the art that implementations of the present technology can be practiced for other types of communications as well (e.g., video, text, and so on).

The techniques introduced here can be implemented as special-purpose hardware (e.g., circuitry), as programmable circuitry appropriately programmed with software and/or firmware, or as a combination of special-purpose and programmable circuitry. Hence, implementations can include a machine-readable medium having stored thereon instructions which can be used to program a computer (or other electronic devices) to perform a process. The machine-readable medium can include, but is not limited to, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other types of media/machine-readable medium suitable for storing electronic instructions.

The phrases "in some implementations," "according to some implementations," "in the implementations shown," "in other implementations," and the like generally mean the particular feature, structure, or characteristic following the phrase is included in at least one implementation of the present technology and can be included in more than one implementation. In addition, such phrases do not necessarily refer to the same implementations or different implementations.

Figure 1:
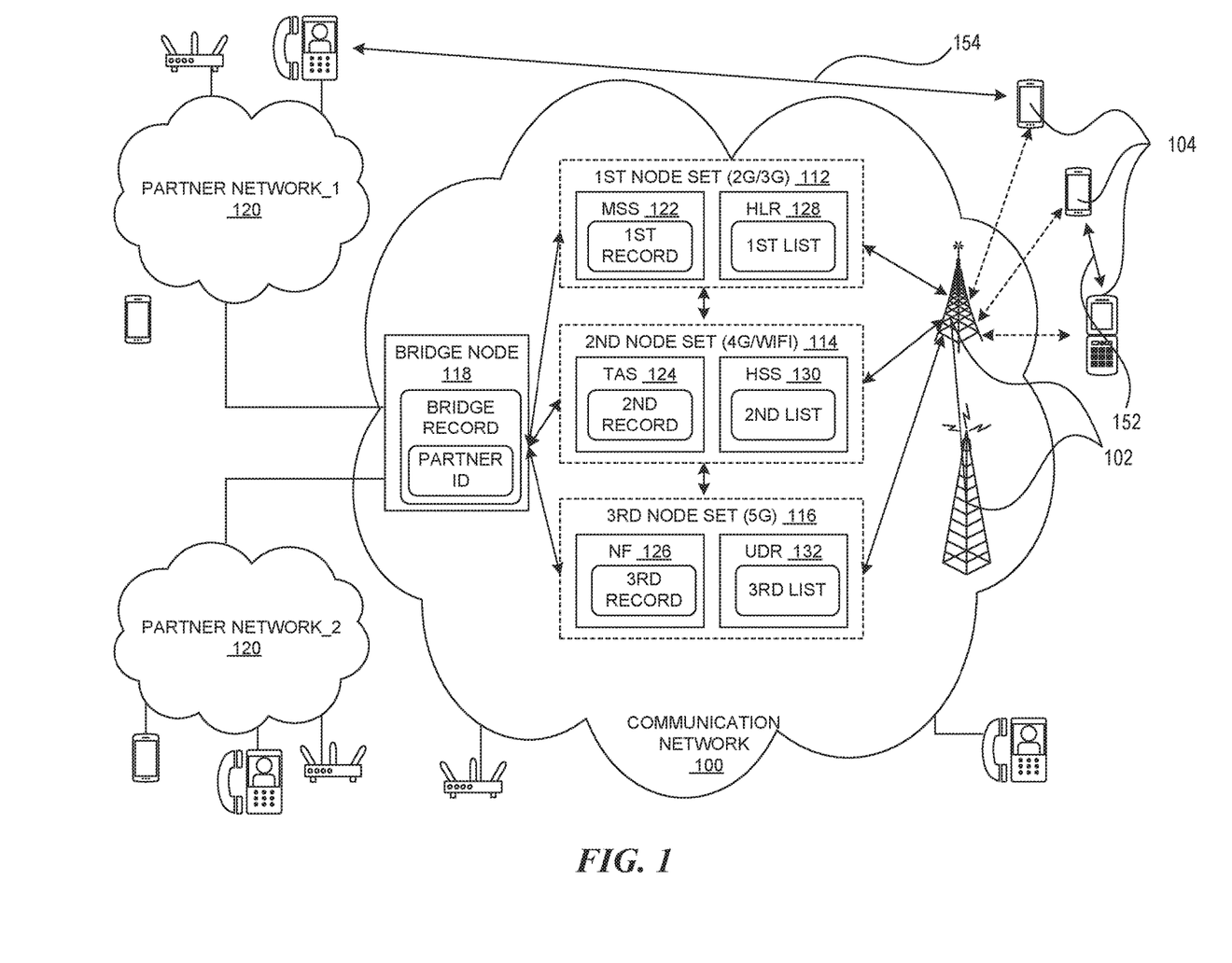
FIG. 1 illustrates a communication network in which some implementations of the present technology can be utilized.

FIG. 1 illustrates a communication network 100 (also referred to herein as network 100) in accordance with various implementations or embodiments. The network 100 can be configured to facilitate data communications between end-point devices, such as consumer electronic devices and/or servers. Further, the network 100 can be configured to integrate different types of data communications, such as for wired and wireless communications, cellular communications, landline communications, LAN/WAN communications, Internet data communications, etc.

For facilitating wireless connections, the network 100 can include a connection node 102 (e.g., a base station (BS) or small cell in 5G) communicatively coupled to one or more user devices 104. Some examples of the user devices 104 can include various mobile and/or static electronic devices, such as mobile and/or smart phones, computers, wearable devices, Internet of Things (IoT) devices, etc. The connection node 102 can serve the user devices 104 located within a geographical area, for example, within a macro cell. The connection node 102 can be configured to connect the served user devices 104 to a larger network (e.g., a wired network). For example, the connection node 102 can communicate voice traffic and/or data traffic between the connected user devices 104 and the larger network. The connection node 102 can include a Radio Access Network (RAN) Node such as an Evolved-Universal Terrestrial Radio Access Network (E-UTRAN) Node B (also commonly denoted an eNode B, or eNB) and/or RNC in an E-UTRAN. The connection node 102 can include a next generation Node B (gNB) or can be a public access point such as a public IEEE 802.11 WiFi access point.

The connection node 102 can communicate with the user devices 104 using one or more communication protocols or standards. Some examples of the communication protocols or standards can include: Global System for Mobile Communications (GSM), Internet Protocol (IP) Multimedia Subsystem (IMS), Time Division Multiple Access (TDMA), Universal Mobile Telecommunications System (UMTS), Evolution-Data Optimized (EVDO), Long Term Evolution (LTE), Generic Access Network (GAN), Unlicensed Mobile Access (UMA), Code Division Multiple Access (CDMA) protocols (e.g., IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), WiMAX protocols (e.g., IEEE 802.16e-2005 and IEEE 802.16m protocols), any of the various IEEE 802.11 standards, High Speed Packet Access (HSPA), (including High Speed Downlink Packet Access (HSDPA) and High Speed Uplink Packet Access (HSUPA)), Ultra Mobile Broadband (UMB), 5G NR (New Radio), and/or other communication networks.

The connection node 102 can be communicatively coupled (e.g., using a backhaul connection) to various other internal nodes (e.g., components, such as servers, switches, controllers, and/or other circuits, and/or functions) that may be configured according to one or more communication standards/protocol. For example, the connection node 102 can include a first node set 112, a second node set 114, a third node set 116, etc. each according to one or more different communication standards/protocols supported by the network 100, e.g., the first node set 112 employs 2G, 3G, and/or landline communications, the second node set 114 employs 4G and/or WiFi communications, and the third node set 116 employs 5G communications.

Some internal nodes can be categorized across technologies based on shared functionalities, such as for communication servicing nodes and/or subscription databases. For example, the servicing nodes (e.g., internal nodes configured to implement or enable the data transfer across the communication network 100) can include Mobile Switching Stations (MSSs) 122 for the first node set 112, Telephony Application Servers (TASs) 124 for the second node set 114, and/or one or more Network Functions (NFs) 126 for the third node set 116. Also, the subscription databases (e.g., internal nodes configured to track subscribers, such as the end users and/or the user devices 104) can include Home Location Registers (HLRs) 128 for the first node set 112, Home Subscriber Servers (HSSs) 130 for the second node set 114, and/or Unified Data Repositories (UDRs) 132 for the third node set 116.

The network 100 can be coupled to and/or include other networks or portions thereof. For example, the connection node 102 can be communicatively coupled to components (e.g., servers, switches, etc.) of the Internet and/or the telephone network. Also, the network 100 can be functionally coupled via bridge nodes 118 to one or more partner networks 120, such as communication networks owned, controlled, and/or operated by other service providers. The bridge nodes 118 can include internal nodes, such as Interconnection Boarder Control Function (IBCF) and/or (interconnecting) Session Border Controller (SBC), configured to facilitate data exchange with the partner networks 120.

Using the various internal nodes, the network 100 can facilitate subscriber to subscriber communications, such as for voice communications and/or text/video message communications. For example, the network 100 can use the first node set 112, the second node set 114, and/or the third node set 116 to facilitate internal communications 152 that occur between subscribers of the network 100. Also, the network 100 can use the various node sets and the bridge nodes 118 to facilitate inter-network communications 154 that occur between a subscriber of the network 100 and one or subscribers of the partner networks 120.

In facilitating the communications, each of the internal nodes can generate and/or track records associated with the provided function(s). For example, the subscriber databases can each include a list of subscriber devices or identifiers that have signed up or have been authorized to utilize the network 100 and/or the communication technology facilitated by the network 100. Also, the servicing nodes can track communication records (e.g., Call Data Records (CDRs)) that describe the communication sessions facilitated by the corresponding nodes. As an illustrative example, the MSSs 122 can track a first record, the TASs 124 can track a second record, and/or the NFs 126 can track a third record of facilitated sessions that utilized the corresponding nodes and/or communication protocols.

Figure 2:
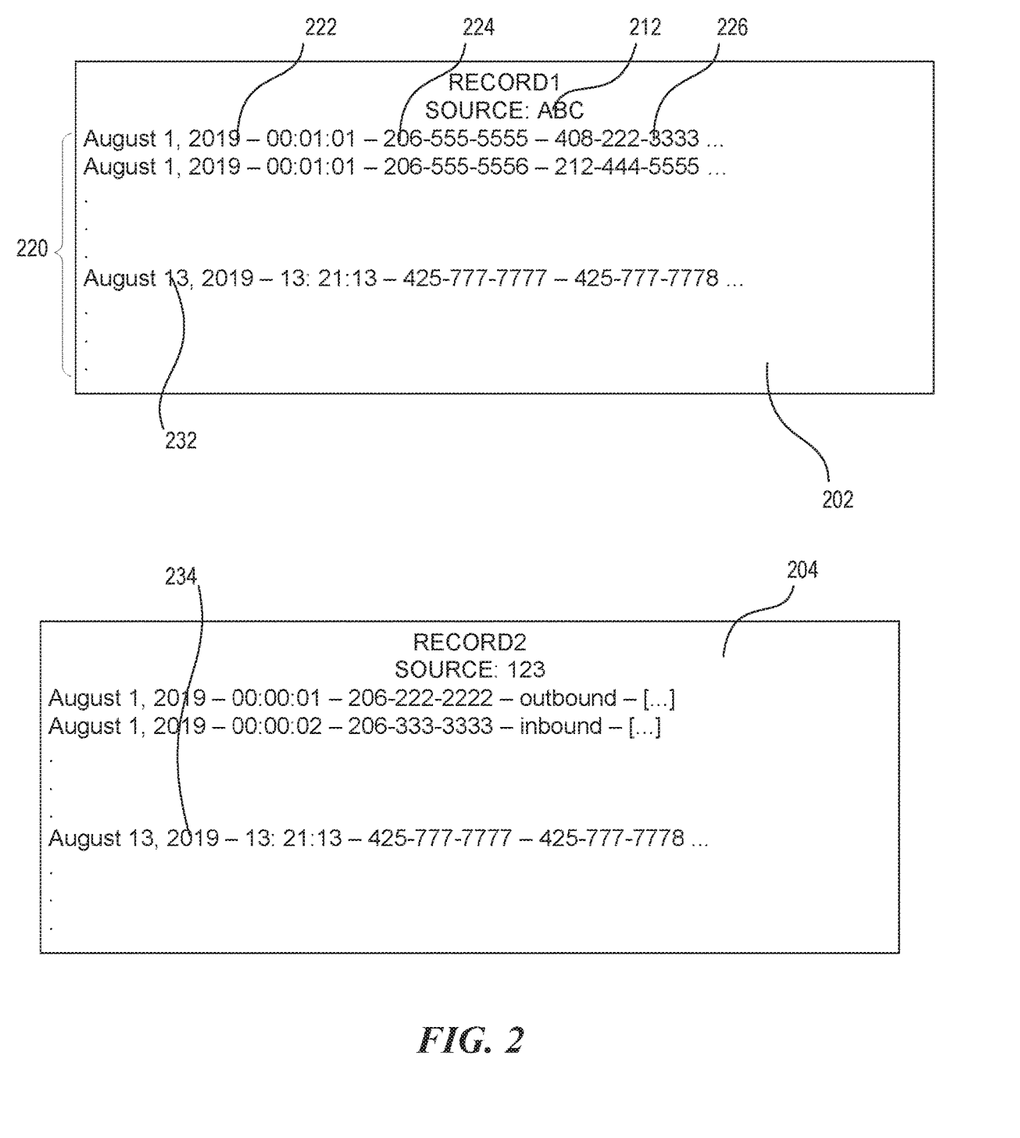
FIG. 2 illustrates example communication records in accordance with one or more embodiments of the present technology.

To illustrate examples of the communication records, FIG. 2 illustrates example communication records, e.g., a first CDR 202 and a second CDR 204. The first CDR 202 and the second CDR 204 can be communication records generated and tracked by different servicing nodes within the network 100 of FIG. 1. Each CDR can include a source identifier 212 that identifies the corresponding servicing node.

The first CDR 202 and the second CDR 204 can each include an entry for each communication session facilitated by the corresponding servicing node. Each entry can include information (e.g., metadata) that describe the facilitated session, such as a timestamp 222, a sender identifier 224, a receiver identifier 226, and/or other descriptions. The sender identifier 224 can identify a device or a subscriber that initiated the communication session (e.g., a caller) and the receiver identifier 226 can identify a counter-part device or subscriber for the communication session (e.g., a call receiver).

As described in detail below, the network 100 obtains records from the servicing nodes. Accordingly, for internal communications 152 of FIG. 1, the network 100 can have a set of complementary entries (e.g., a first matching entry 232 and a second matching entry 234) that describe the same session from different perspectives. For example, the first matching entry 232 can correspond to the servicing node that connected to the caller and the second matching entry 234 can correspond to the servicing node that connected to the call receiver. The matching entries can both have the same values for the sender identifier 224 and the receiver identifier 226. The matching entries can also have timestamp values that are identical or within a threshold duration. For the inter-network communications 154 of FIG. 1, the network 100 can have entries that correspond to only one of the perspectives, such as either the caller or the call receiver. The entries for inter-network communications 154 can correspond to entries in the records from the bridge nodes 118 since the communication counterparts are subscribers for the partner networks 120 of FIG. 1.

Figure 3A:
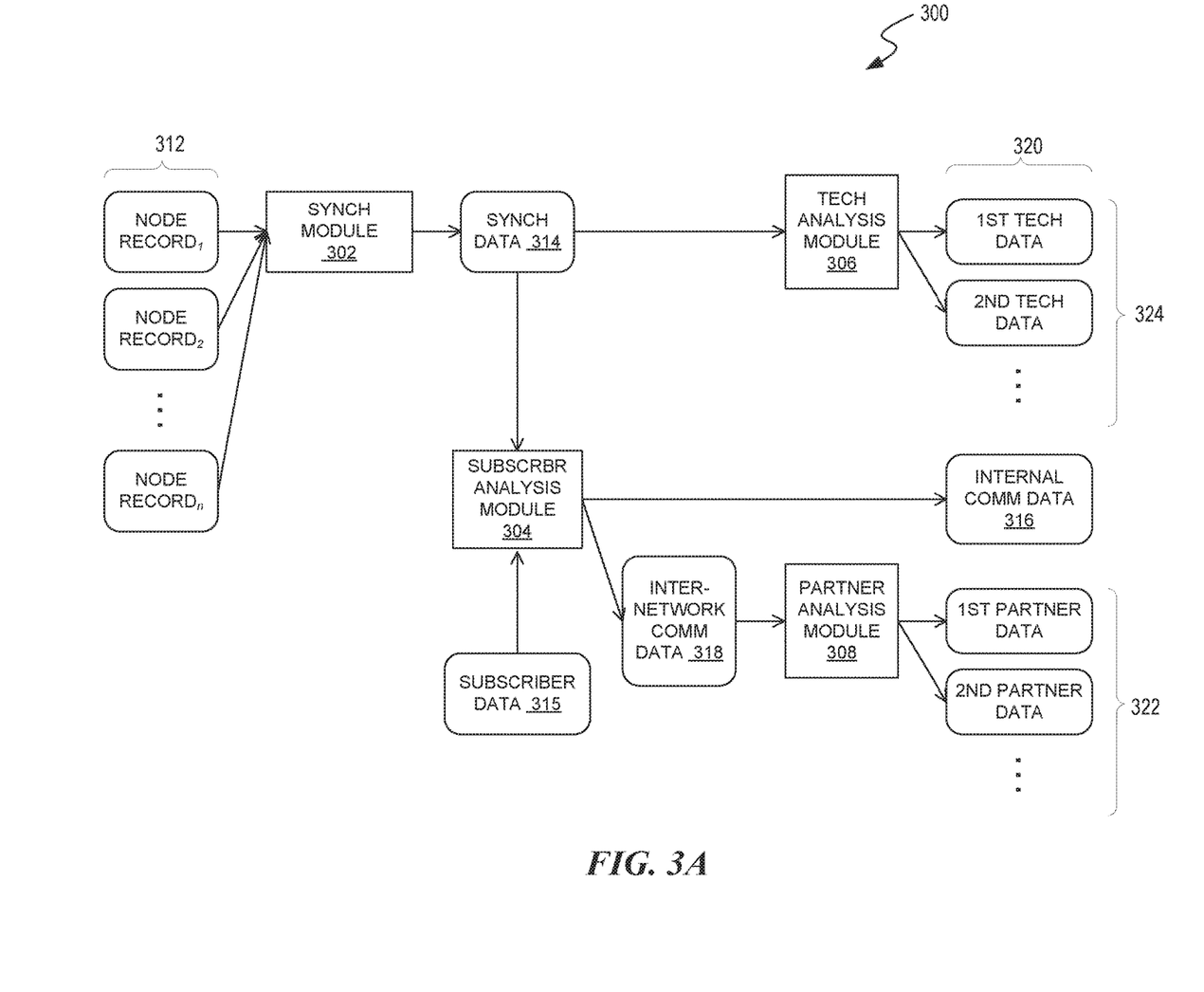
FIG. 3A illustrates a data flow in accordance with one or more embodiments of the present technology.

FIG. 3A illustrates a data flow 300 in accordance with one or more embodiments of the present technology. The data flow 300 can illustrate a set of modules (e.g., computing processes/routines and/or corresponding circuits) and inputs-outputs associated thereto. The data flow 300 can use the inputs and intermediate processing results to generate detailed metrics 320 that describe various aspects of communications facilitated by the network 100 of FIG. 1. For example, the data flow 300 can generate the detailed metrics 320 that describe in-network communications, off-network communications, communications that utilize specific technologies, communications that interfaced with a particular partner network, or a combination thereof.

The network 100 (at, e.g., a centralized computing device/ function) can include a synchronization module 302 configured to obtain node records 312 (e.g., CDRs) from various servicing nodes. For example, the synchronization module 302 can obtain the CDRs from the MSSs 122 of FIG. 1, the TASs 124 of FIG. 1, and/or the NFs 126 of FIG. 1 within the network 100. Accordingly, the synchronization module 302 can obtain records of communications to and/or from the subscribers of the network 100. The synchronization module 302 may correspond to reporting functions of the servicing nodes and/or querying functions of the centralized computing device/function.

The synchronization module 302 can be further configured to generate synchronized data 314 based on the obtained node records 312. The synchronization module 302 can generate the synchronized data 314 based on combining the entries from the obtained node records 312 and/or sorting the entries according to the timestamps 222 of FIG. 2. To track the sorted entries, the synchronization module 302 can add or correlate the source identifier 212 to the entries within the corresponding record before the sorting process. Based on synchronizing the data, the network 100 can distinguish between multiple sessions that involved the same parties.

The network 100 can include a subscriber analysis module 304 that receives/accesses the synchronized data 314. The subscriber analysis module 304 can be configured to analyze the session information (e.g. the synchronized data 314) according to subscriber data 315 (e.g., subscriber lists tracked by the subscriber databases, such as the HLRs 128 of FIG. 1, the HSSs 130 of FIG. 1, and/or the UDRs 132 of FIG. 1). The subscriber analysis module 304 can analyze by comparing the sender identifier 224 of FIG. 2 and/or the receiver identifier 226 of FIG. 2 to the subscriber data 315 and/or searching for the identifiers in the subscriber data 315. Based on the comparison/search, the subscriber analysis module 304 can identify the subscriber(s) associated with each entry in the synchronized data 314.

Using the identified subscribers, the subscriber analysis module 304 can identify the internal communications 152 of FIG. 1 and the inter-network communication 154 of FIG. 1. The subscriber analysis module 304 can identify the internal communications 152 based on the entries that have the sender identifier 224 of FIG. 2 and the receiver identifier 226 as subscribers in the subscriber data 315. The subscriber analysis module 304 can identify the inter-network communication 154 based on the entries that have the sender identifier 224 of FIG. 2 and/or the receiver identifier 226 missing in the subscriber data 315.

The subscriber analysis module 304 can generate internal communication data 316 (e.g., a type of the detailed metric 320) based on the entries associated with the internal communication 152. For example, the internal communication data 316 can include the entries associated with the internal communication 152 and/or one or more aspects of such entries. Also, the subscriber analysis module 304 can generate the internal communication data 316 based on deriving one or more results from the entries, such as by tallying a total number of sessions and/or by performing a pattern analysis according to time or context pattern associated with the sessions. In generating the internal communication data 316, the subscriber analysis module 304 can identify and combine or eliminate duplicate or counterpart entries (e.g., the first matching entry 232 of FIG. 2 and the second matching entry 234 of FIG. 2) for the same session. The subscriber analysis module 304 can combine the source identifiers 212 for the entry and/or delete one of the entries so that each session is represented by one entry.

The subscriber analysis module 304 can also generate inter-network communication data 318 based on the entries associated with the inter-network communication 154. For example, the inter-network communication data 318 can include the entries associated with the inter-network communication 154 and/or one or more aspects of such entries. Accordingly, each of the inter-network communications 154 can be represented by one entry in the inter-network communication data 318.

The network 100 can include a partner analysis module 308 that receives and processes the inter-network communication data 318. The partner analysis module 308 can be configured to generate partner data 322 (e.g., a type of the detailed metric 320) based on entries associated with corresponding partner network (e.g., partner service provider). For example, the partner analysis module 308 can generate the partner data 322 for the partner networks 120 that each includes the entries of the communications associated with the corresponding partner network 120. Also, the partner analysis module 308 can generate the partner data 322 to include processing results of the communications associated with each of the partner networks 120, such as a total number of sessions and/or patterns according to time or context pattern associated with the sessions that involve the corresponding partner network 120.

The network 100 can also include a technology analysis module 306 that receives the synchronized data 314. The technology analysis module 306 can be configured to generate technology data 324 (e.g., a type of the detailed metric 320) based on entries associated with corresponding communication technologies (e.g., landline, 2G, 3G, 4G, 5G, WiFi, etc.) utilized for the communication. For example, the technology analysis module 306 can generate the technology data 324 for the communication technologies that each includes the entries of the communications that utilized the corresponding technology. Also, the technology analysis module 306 can generate the technology data 324 to include processing results of the communications associated with each of the technologies, such as a total number of sessions and/or patterns according to time or context pattern associated with the sessions that utilized the corresponding technology.

The technology analysis module 306 can generate the technology data 324 based on grouping the entries according to the utilized technologies. The technology analysis module 306 can identify the utilized technology according to the source identifier 212 associated with the entries. The technology analysis module 306 can compare the source identifier 212 to predetermined mappings (e.g., one or more lookup tables) and identify the technology category associated with the internal node that provided the record/entry. The technology analysis module 306 can generate the technology data 324 based on grouping the entries according to the resulting technology category values. For example, the technology analysis module 306 can generate the technology data 324 that represents the number and/or the patterns of communication sessions that employed landlines, 2G, 3G, 4G, 5G, and/or WiFi.

In communication networks, technology data (e.g., the technology data 324) may be locally available to specific network layers and/or entities. However, for a communication session (e.g., a voice call) involving two more more parties, technology data fails to register all parties. For example, when an LTE handset is attached/connected to LTE radio, a corresponding Evolved Packet Core (EPC) network and/or a corresponding IP Multimedia Subsystem (IMS) network may determine that the LTE handset is registered to the mobile network using 4G-LTE protocol and not 2G/3G. However, if the LTE handset user is making a call to a party in a different network, the corresponding call CDR logs do not have oversight about the designation party domain. As described above, the network 100 can obtain and analyze the CDRs that partially describe communication sessions to derive the full picture on communications between on-net and off-net calls across different partner networks and/or technologies.

As an illustrate example, the data flow 300 has been described according to a sequence or an arrangement shown in FIG. 3A. However, it is understood that the data flow 300 can be sequenced or arranged differently. For example, the technology analysis module 306 can receive and process the node records 312 instead of the synchronized data 314. Also, the technology analysis module 306 can be directly coupled to the subscriber analysis module 304. The technology analysis module 306 can be before or after the subscriber analysis module 304. Accordingly, the data flow 300 can generate the detailed metrics 320 that further breakdown the internal communication data 316, the inter-network communication data 318, and/or the partner data 322 according to the communications technology. Additionally or alternatively, the data flow 300 can generate the detailed metrics 320 that further breakdown the technology data 324 according to in-network/off-network communications and/or according the partner networks 120.

Figure 3B:
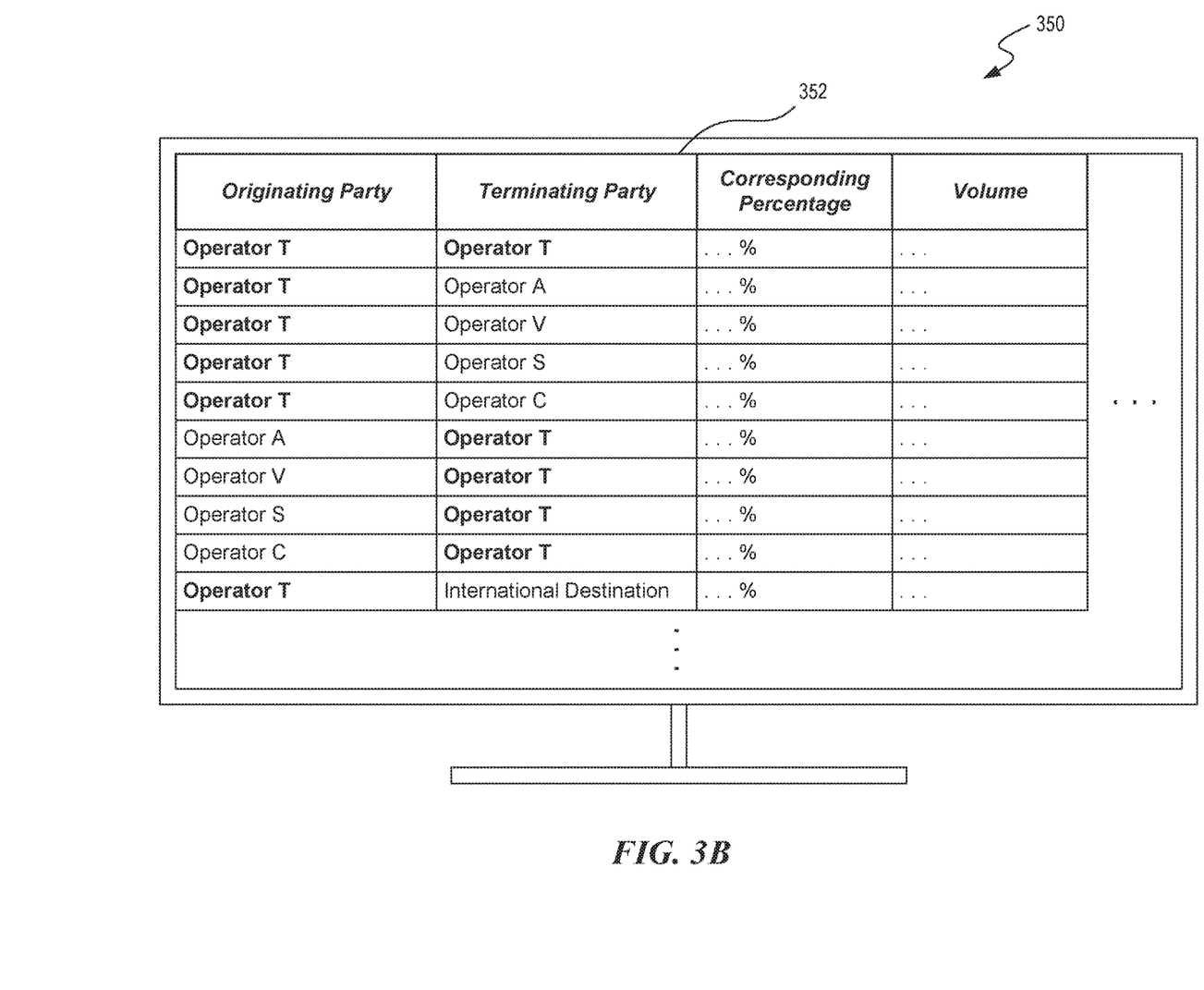
FIG. 3B illustrates characterization data in accordance with one or more embodiments of the present technology.

FIG. 3B illustrates characterization data 350 (e.g., the detailed metrics 320 of FIG. 3A) in accordance with one or more embodiments of the present technology. As an illustrative example, the characterization data 350 can represent a distribution (via, e.g., percentages and/or volume of total sessions) of communications facilitated by the network 100 of FIG. 1. For representing the distribution of communications for Operator T (e.g., an owner/operator for the network 100), the characterization data 350 can describe percentages/volumes of communication sessions originated by and/or terminated by the Operator T. As shown in FIG. 3B, the characterization data 350 can represent the percentages/volumes of internal communication sessions (e.g., between subscribers of Operator T). Also, the characterization data 350 can represent the percentages/volumes of external communication sessions involving subscribers of Operator T and other operators (e.g., the partner networks 120 of FIG. 1, such as Operators A, V, S, C, and/or international destination/operators). The network 100 can further process the characterization data 350 can be further processed or analyzed according to the technology (e.g., 2G, 3G, 4G, and/or 5G) utilized by Operator T.

The network 100 can communicate the characterization data 350 to one or more human operators via a user interface for further analysis. For example, the network 100 can visually communicate the characterization data 350 via a display screen 352 as illustrated in FIG. 3B.

Figure 4:
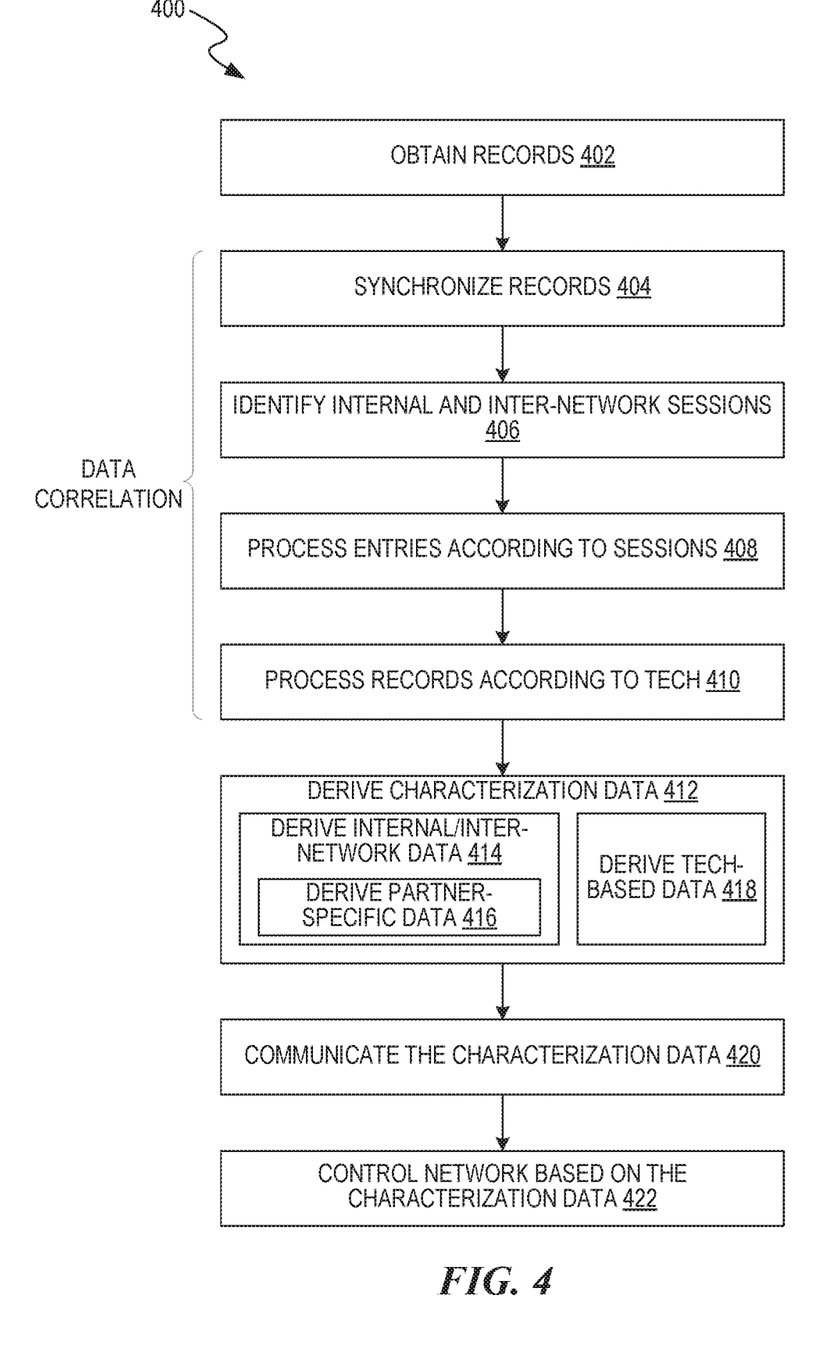
FIG. 4 is a flow diagram illustrating an example method for processing network traffic in accordance with one or more embodiments of the present technology.

FIG. 4 is a flow diagram illustrating an example method 400 for processing network traffic in accordance with one or more embodiments of the present technology. The method 400 can be for operating the network 100 of FIG. 1 or one or more components therein. The method 400 can implement the data flow 300 of FIG. 3A, a portion thereof, and/or a derivation thereof.

At block 402, the method 400 obtains records (e.g., the first and second reports 202/204 of FIG. 2, such as CDRs) from components/functions therein. For example, the method 400 can gather or collect the CDRs from network components/functions, such as the MSSs 122 of FIG. 1, the TASs 124 of FIG. 1, and/or the NFs 126 of FIG. 1, at a centralized device or function. The CDRs can be obtained from multiple sources within the network 100 via self-reporting process implemented by the components/functions and/or via a querying process implemented by the centralized device/function.

As illustrated in blocks 404 through 410, the method 400 correlates the obtained records. For example, the method 400 can sort, group, synchronize, and/or filter information within the obtained records according to one or more attributes of communication sessions that correspond to the internal communications 152 of FIG. 1, the inter-network communications 154 of FIG. 1, the partner networks 120 of FIG. 1, and/or protocols utilized in facilitating the sessions.

At block 404, the method 400 synchronizes the records. The method 400 can synchronize the CDR and/or the entries therein according to the timestamps 222. For example, the method 400 synchronizes the records by grouping or sorting the CDR entries according to time of the communication session. Accordingly, the method 400 can generate the synchronized data 314 of FIG. 3A that may include groupings of entries having the same timestamp value.

At block 406, the method 400 identifies internal and inter-network communication sessions based on the records. To identify the internal and the inter-network sessions, the network can access one or more of the subscription databases (e.g., the HLRs 128 of FIG. 1, the HSSs 130 of FIG. 1, and/or the UDRs 132 of FIG. 1) and obtain the subscriber data 315 of FIG. 3A. The method 400 can compare the subscriber data 315 to the sender identifiers 224 of FIG. 2 and/or the receiver identifiers 226 of FIG. 2 within the entries. The method 400 can categorize the entries as being associated to the internal communications 152 when the sender identifiers 224 and the receiver identifiers 226 of the corresponding entries are found in the subscriber data 315. Otherwise the method 400 can categorize the entries as being associated to the inter-network communication 154 (e.g., when at least one other identifiers in the entries are not found within the subscriber data 315 or if an identifier is missing). In other words, the method 400 can recognize the entries as being representative of the internal communications 152 when all parties are subscribers according to the subscriber data 315. The method 400 can categorize the remaining entries as being representative of the inter-network communication 154.

At block 408, the method 400 processes the records according to sessions. The method 400 can combine or group the entries according to identified sessions. For example, the method 400 identifies multiple entries that have matching timestamp values (e.g., identical values or values that are within a threshold time window from each other) and matching sender/receiver identifiers as being associated with one communication session. Accordingly, the method 400 can eliminate or combine entries that correspond to the same communication session but from different perspectives, such as for sessions that include multiple subscribers. In other words, when more than one subscriber takes part in the communication session (e.g., the internal communication 152 and/or multi-party communications that include multiple subscribers), nodes that correspond to each subscriber can generate CDRs for the same communication session. Accordingly, the method 400 can eliminate the redundant entries or combine them to represent a single communication session.

At block 410, the method 400 processes records according to communication technology. For example, the method 400 processes the CDRs and/or the entries therein according to the source identifiers 212 of FIG. 2. The method 400 can identify the communication technologies (e.g., 2G, 3G, etc.) utilized to facilitate the communication sessions based on the source identifiers 212 as described above. The method 400 can add information to each of the entries that identify the utilized communication technology. Additionally or alternatively, the method 400 can generate a list for each communication technology that includes the CDR entries associated with the corresponding communication technology.

At block 412, the method 400 derives characterization data (e.g., the characterization data 350 of FIG. 3B) based on correlating the data. The characterization data can include one or more detailed metrics (e.g., subsets of entries, a number of sessions, and/or a trend/pattern) according to the communication session attributes, such as the internal communication data 316 of FIG. 3A, the inter-network communication data 318 of FIG. 3A, the partner data 322 of FIG. 3A, and/or the technology data 324 of FIG. 3A.

As an illustrative example, a mobile operator (corresponding to, e.g., the network 100) in a particular region (e.g., country) may have/implement 2G, 3G, 4G, and 5G radio technologies. The characterization data can represent a distribution of incoming and/or outgoing communications for the mobile operator relative to other partner networks in and/or outside the region (corresponding to, e.g., international calls). Additionally or Alternatively, the characterization data can represent a distribution of communications per technology. In other words, for the mobile operator, the characterization data can represent a distribution of communications that utilized 2G, 3G, 4G, and/or 5G radio technologies. The characterization data can further represent how the call distribution is working internally (e.g., within the network 100).

At block 414, the method 400 derives internal and inter-network data. The method 400 can derive the internal data based on the entries associated with internal communications 152. As described above, the method 400 can generate the internal communication data 316 to include the identified entries. In addition to or as an alternative, the method 400 can generate the internal communication data 316 by calculating the number of internal communications 152 within the obtained records. Also, the method 400 can generate the internal communication data 316 by identifying any patterns and/or trends, such as by using machine-learning and/or pattern recognition mechanisms.

The method 400 can derive the inter-network data based on the entries associated with the inter-network communications 154. As described above, the method 400 can generate the inter-network communication data 318 to include the identified entries associated with the inter-network communications 154. In addition to or as an alternative, the method 400 can generate the inter-network communication data 318 by calculating the number of inter-network communications 154 (e.g., the session-based entry groupings) within the obtained records. Also, the method 400 can generate the inter-network communication data 318 by identifying any patterns and/or trends, such as by using machine-learning and/or pattern recognition mechanisms.

At block 416, the method 400 derives partner-specific data. The method 400 can use the inter-network communication data 318 to generate the partner data 322. The method 400 can analyze the obtained records to separately identify certain records, such as the bridge records from the bridge nodes 118 based on data from the IBCFs and/or SBCs. The method 400 can determine the partner identifiers from the bridge records based on correlating the inter-network communication data 318 with the bridge records. For example, the method 400 can correlate the entries associated with the inter-network communications 154 the bridge records based on combining or grouping the obtained record entries according to communication sessions as described above. As a result, the bridge record entries and other functional note entries for the same session can be grouped together. Accordingly, the method 400 can identified the bridge records and extract the partner identifiers therein to determine the partner networks interfaced during the corresponding sessions. The method 400 can use the partner identifiers to generate the partner data 322. For example, the method 400 calculates a metric for each of the partner networks 120 by calculating a number of communications and/or pattern associated with communications that connected to the corresponding partner network. Accordingly, the partner metric can represent a subset of the inter-network communications that is associated with the corresponding partner network.

At block 418, the method 400 derives technology-based data. The method 400 can generate the technology data 324 based on categorizing the entries according to the utilized protocols as described above. The method 400 can identify the entries and the corresponding sessions according to the utilized technology based on the node that generated the record. The method 400 can identify the protocol were utilized for each of the record and or the entries therein. The method 400 can grouper filter the entries according to the utilized protocol for generating the technology data 324. For example, the method 400 can identify and/or group the entries associated with the 2G protocol, the 3G protocol, etc. Also, the method 400 can calculate metrics, such as in number of facilitated sessions and/or a trend, for the different technologies based on identified/grouped entries.

At block 420, the method 400 communicates the characterization data. For example, the method 400 can display or otherwise output the detailed metric 320 to an operator, such as illustrated in FIG. 3B. Also, the method 400 can communicate the detailed metric 320 to other analysis systems or tools for further processing. Accordingly, the operator and/or the other analysis systems/tools can utilize the characterization data for other uses, such as for developing or adjusting subscription programs and/or partner carrier relationships.

At block 422, the method 400 controls one or more components/functions therein based on the characterization data (e.g., the detailed metric 320). For example, the method 400 uses the partner data 322 to instantiate or recommend additional bridge nodes. Also, the method 400 can use the technology data 324 to instantiate additional 5G NFs. Accordingly, the method 400 can control components and/or functions according to targeted aspects of actual usage data, thereby increasing efficiency of the method 400.

As an illustrative example, the HSS may be replaced with User Data Management (UDM) function for 5G Stand Alone topology (e.g., Option-2, per 3GPP). For the 5G topology, correlation with HSS database can be implemented using UDM profile data correlation. If UDM query results indicate that one of the communication parties is not found in the UDM record, then the unfound communication party may not be a subscriber for the 5G option-2 service provided by the network 100. The same type of search could be done also for 2G, 3G, and/or 4G using HLR and/or HSS database. If the called or calling party from the CDR is not found in any of the databases, then the corresponding party may not be a subscriber to the network 100. The corresponding session can be attributed accordingly.

Figure 5:
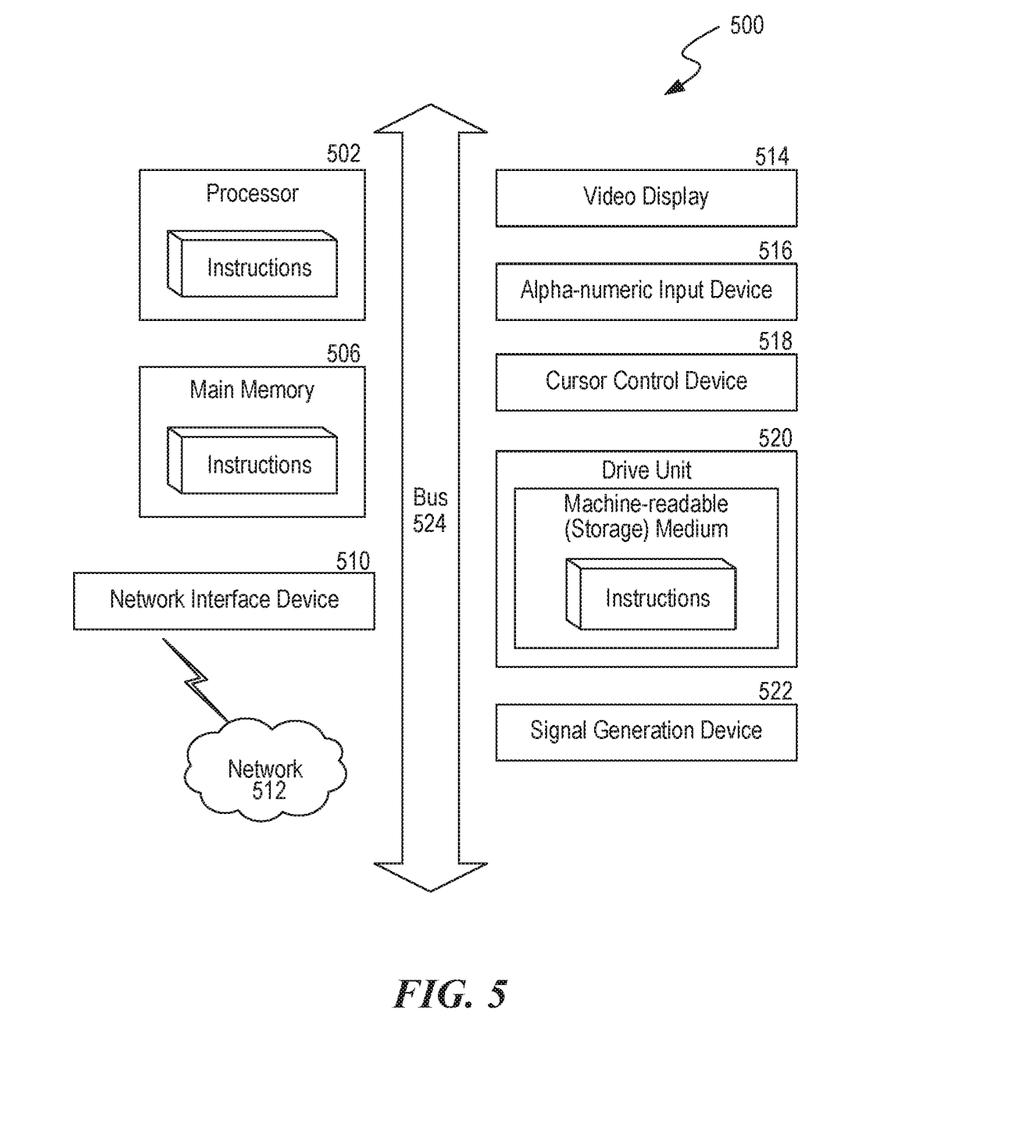
FIG. 5 is a diagrammatic representation of a machine in the example form of a computer system within which a set of instructions, for causing the machine to perform any one or more of the methodologies discussed herein, can be executed.

FIG. 5 is a diagrammatic representation of a machine in the example form of a computer system or machine 500 within which a set of instructions, when executed, can cause the machine to perform any one or more of the processes (e.g., method 400) described above. The machine 500 operates as a standalone device, while in other embodiments, the machine 500 can be connected (e.g., networked) to other machines. In a networked deployment, the machine 500 can operate in the capacity of a server or a client user machine in a client-server network environment, or as a peer machine in a peer-to-peer (or distributed) network environment. The machine can include a user device, such as User devices 104 discussed above, the gNB, and/or other network components (e.g., cloud computing devices and/or servers). In some implementations, the machine 500 includes 5G servers. While a single machine is illustrated, the machine 500 can include any collection of machines that individually or jointly execute instructions to perform any of the methods described above.

The machine 500 can include a processor 502, a main memory 506 and a bus 524. The bus 524 can include a subsystem for transferring data between the components of the machine 500, including transferring data between the main memory 506 and the processor 502. The bus 524 can represent one or more separate physical buses, point to point connections, or both, connected by appropriate bridges, adapters, or controllers. The machine 500 can also include a display device 514, one or more input devices 516, a cursor control device 518 (e.g., a mouse), a drive unit 520, a signal generation device or output device 522 (e.g., a speaker, a remote control, etc.) and a network interface device 510, among others.

The processor(s) 502 can control the overall operation of the machine 500. The processor(s) 502 can execute computer programs or firmware stored in memory (for example, 506, 520). The processor(s) 502 can include one or more programmable general-purpose or special-purpose microprocessors, digital signal processors ("DSPs"), programmable controllers, application specific integrated circuits ("ASICs"), programmable logic devices ("PLDs"), trusted platform modules ("TPMs"), or the like, or a combination thereof.

The main memory 506 represents any form of memory (e.g., RAM, ROM, flash memory, or the like) or a combination of such devices connected to the bus 524. The drive unit 520 can include a machine-readable medium or machine-readable storage medium (such as computer-readable media) that stores, encodes or carries one or more sets of instructions for execution by the machine 500 to perform any or all of the methods described above. It should be noted that the term "machine-readable medium" and "machine-readable storage medium" can include a single medium or multiple media (e.g., a centralized or distributed database, and/or associated caches and servers) that store the one or more sets of instructions embodying any or all of the methods described above.

In general, the routines executed to implement the embodiments of the disclosure can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

The network interface device 510 allows the machine 500 to mediate data in various networks with one or more entities that are external to the machine, through any known and/or convenient communications standards and protocols supported by the machine 500 and the external entities. Example protocols supported by the machine 500 include, but are not limited to: IP protocols for the application layer, transport layer protocols, Internet layer protocols, link layer protocols, LTE protocols, 3G/4G/5G protocols, etc. The network interface device 510 can include one or more of a network adaptor card, a wireless network interface card, a router, an access point, a wireless router, a switch, a multi-layer switch, a protocol converter, a gateway, a bridge, a bridge router, a hub, a digital media receiver, a repeater, or other interfaces for supporting the various protocols. Although the present disclosure describes the components and functions implemented in the embodiments with reference to particular standards and protocols that represent examples of the state of the art, the disclosure is not limited to such standards and protocols, and includes functional equivalents that can supersede the current state of the art.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of implementations of the system is not intended to be exhaustive or to limit the system to the precise form disclosed above. While specific implementations of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, or blocks are presented in a given order, alternative implementations may perform routines having blocks, or employ systems having blocks, in a different order, and some processes or blocks may be deleted, moved, added, subdivided, combined, and/or modified to provide alternative or subcombinations. Each of these processes, message/data flows, or blocks may be implemented in a variety of different ways. Also, while processes or blocks are at times shown as being performed in series, these processes or blocks may instead be performed in parallel, or may be performed at different times. Further, any specific numbers noted herein are only examples; alternative implementations may employ differing values or ranges.

The teachings of the methods and system provided herein can be applied to other systems, not necessarily the system described above. The elements, blocks, and acts of the various implementations described above can be combined to provide further implementations.

Any patents and applications and other references noted above, including any that may be listed in accompanying filing papers, are incorporated herein by reference. Aspects of the technology can be modified, if necessary, to employ the systems, functions, and concepts of the various references described above to provide yet further implementations of the technology.

These and other changes can be made to the invention in light of the above Detailed Description. While the above description describes certain implementations of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific implementations disclosed in the specification, unless the above Detailed Description section explicitly defines such terms. Accordingly, the actual scope of the invention encompasses not only the disclosed implementations, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as implemented in a computer-readable medium, other aspects may likewise be implemented in a computer-readable medium. Accordingly, the inventors reserve the right to add additional claims after filing the application to pursue such additional claim forms for other aspects of the technology.

I claim:

1. At least one non-transitory, computer-readable medium carrying instructions that, when executed by at least one data processor in a computing system, cause the computing system to perform a method for analyzing Call Data Records (CDRs), the method comprising:
   obtaining CDRs from multiple sources within a wireless network configured to route communication data to and from multiple user devices,
      wherein the CDRs represent communication records for a set of nodes that are configured to provide connections to partner networks, provide communications within the network, facilitate multiple, and different communication protocols, and
      wherein the wireless network is managed by one wireless service provider, while the partner networks are managed by at least one different and independent wireless service provider;
   identifying internal subscribers for the network based on the CDRs;
   identifying remaining communication party identifiers in the CDRs, wherein the remaining communication party identifiers represent subscribers of the partner networks;
   calculating metrics based on the internal subscribers and the external subscribers,
      wherein the metrics represent internal communications between the subscribers and inter-network communications between internal subscribers and the external subscribers, and
      wherein each of the internal communications are within the network and are between two users who are both subscribers of the wireless service provider, while each of the inter-network communications are between two users where one user is a subscriber of the wireless service provider and the other user is a subscriber of the different independent wireless service provider; and
   displaying the detailed metric for characterizing communications facilitated by the network.

2. The computer-readable medium of claim 1, wherein identifying the internal subscribers includes accessing one or more subscription databases that track the internal subscribers of the network.

3. The computer-readable medium of claim 2, wherein the one or more subscription databases include Home Location Registers (HLRs), Home Subscriber Servers (HSSs), and/or Unified Data Repositories (UDRs).

4. The computer-readable medium of claim 1, wherein the method further comprises:
   generating inter-network communication data representative of the inter-network communications;
   identifying bridge records that represent CDRs associated with nodes configured to connect the network to the partner networks;
   determining partner identifiers for the inter-network communications based on correlating the inter-network communication data with the bridge records, wherein the partner identifiers represent the partner networks;
   calculating a partner metric for each of the partner networks based on the partner identifiers, wherein the partner metric represents a subset of the inter-network communications associated with the corresponding partner network; and
   displaying the partner metric for characterizing the communications facilitated by the network.

5. The computer-readable medium of claim 4, wherein the bridge records correspond to CDRs from Interconnection Boarder Control Functions (IBCFs) and Session Boarder Controllers (SBCs).

6. The computer-readable medium of claim 1, wherein the method further comprises:
   categorizing the CDRs or entries therein according to source identifiers that identify the node reporting the corresponding CDR or entry, wherein the reporting nodes are categorized according to communication protocols supported by the corresponding node;
   based on the categorization, calculating a technology metric for each of the communication protocols used to facilitate the data communications, wherein the calculated technology metrics are subsets of communications facilitated by the network; and
   displaying the calculated technology metrics for characterizing the communications facilitated by the network.

7. The computer-readable medium of claim 6, wherein the technology metrics correspond to usage of Second-Generation (2G) communication components, Third-Generation (3G) communication components, Fourth-Generation (4G) communication components, Fifth-generation (5G) communication components, Long-Term Evolution (LTE) communication components, LTE Advanced communication components, Wireless Fidelity (WiFi) communication components, and/or land-line communication components.

8. The computer-readable medium of claim 1, wherein obtaining the CDRs include obtaining the CDRs from Mobile Switching Stations (MSSs), Telephony Application Servers (TAS), and/or Network Functions (NFs).

9. The computer-readable medium of claim 1, wherein the method further comprises controlling a network component according to the detailed metric.

10. The computer-readable medium of claim 9, wherein the network component includes a Network Function (NF), and wherein the network includes an IP Multimedia Subsystem (IMS) network.

11. A method of operating a telecommunication network, the method comprising:
   obtaining records from multiple sources within the telecommunication network,
      wherein the network is configured to route communication data to and from multiple user devices, and
      wherein the records include data associated with one or more functionalities of nodes configured to facilitate communication across the telecommunication network;
   correlating the records from the multiple sources according to one or more communication session attributes that correspond to internal communications, inter-network communications, partner networks, communication protocols, or a combination thereof,
      wherein the telecommunications network is managed by one organization, while the partner networks are managed by at least one different, independent organization, and
      wherein the internal communications originate and terminate within the telecommunications network while the inter-network communications only originate or terminate within the telecommunications network;

calculating one or more detailed metrics based on the correlation, wherein the detailed metric represents communication sessions facilitated by the network according to the one or more communication session attributes; and displaying the one or more detailed metrics for characterizing the communication sessions facilitated by the network.

12. The method of claim 11, further comprising:
obtaining subscriber data that identifies subscribers of the telecommunication network;
wherein:
the records include entries that each represent a communication session, each of the entries having a sender identifier and a receiver identifier representative of communicating parties for the communication session;
correlating the records includes identifying the entries associated with the internal communications and the inter-network communications based on comparing sender identifiers and receiver identifiers to the subscriber data, wherein:
the internal communications correspond to communications between the subscribers, and
the inter-network communications correspond to communications involving at least one identifier representative of subscribers of the partner networks;
calculating the one or more detailed metrics includes:
calculating internal communication data based on entries associated with the internal communications, and
calculating inter-network communication data based on entries associated with the inter-network communications.

13. The method of claim 12, further comprising:
identifying bridge records associated with bridge nodes configured to connect the network to the partner networks;
determining partner identifiers for the inter-network communications based on correlating the entries associated with the inter-network communications with the bridge records, wherein the partner identifiers represent the partner networks involved in the corresponding communication sessions; and
wherein:
calculating the one or more detailed metrics includes calculating a partner metric for each of the partner networks based on the partner identifiers, wherein the partner metric represents a subset of the inter-network communications associated with the corresponding partner network.

14. The method of claim 12, wherein:
each of the entries include a timestamp representing a time of the communication session;
correlating the records includes:
synchronizing the entries according to the timestamps;
identifying one or more groupings of matching entries based on the correlated timestamps and based on identifying matching instances of the sender identifiers and receiver identifiers in the entries, wherein each grouping of the matching entries represents a single instance of the communication session; and
calculating the internal communication data includes calculating the internal communication data according to the one or more groupings.

15. The method of claim 11, wherein:
each of the records includes:

a source identifier representative of a corresponding reporting node, and
entries that each represent a communication session;
calculating the one or more detailed metrics includes:
identifying a protocol for each of the records based on the source identifier, wherein the protocol represents a communication technology utilized to facilitate one or more corresponding communication sessions; and
calculating technology data for each protocol according to the entries associated with the corresponding protocol, wherein the technology data represents the communication sessions facilitated by the corresponding communication technology.

16. A system for use in a network, the system comprising:
at least one processor;
at least one memory operably coupled to the at least one processor and storing computer executable instructions that, when executed by the at least one processor, causes one or more of the network components to:
access records from multiple sources within a network configured to route communication data to and from multiple user devices,
wherein the records include data associated with one or more functionalities of nodes configured to facilitate communication across the communication network;
correlate the records from the multiple sources according to one or more communication session attributes that correspond to internal communications, inter-network communications, partner networks, communication protocols, or a combination thereof;
calculate one or more detailed metrics based on the correlation, wherein the detailed metric represents communication sessions facilitated by the network according to the one or more communication session attributes; and
display the one or more detailed metrics for characterizing the communication sessions facilitated by the network.

17. The system of claim 16, wherein the at least one memory further includes the computer executable instructions to adjust one or more components and/or functions in the system according to the detailed metrics.

18. The system of claim 16, wherein:
the records include entries that each represent a communication session, each of the entries having a sender identifier and a receiver identifier representative of communicating parties for the communication session;
the at least one memory further includes the computer executable instructions to:
correlate the records by identifying the entries associated with the internal communications and the inter-network communications, wherein:
the internal communications correspond to communications between subscribers of the network, and
the inter-network communications correspond to communications involving at least one party subscribed to one of the partner networks;
calculating the one or more detailed metrics based on:
calculating internal communication data based on entries associated with the internal communications, and
calculating inter-network communication data based on entries associated with the inter-network communications.

19. The system of claim 18, wherein the at least one memory further includes the computer executable instructions to:
- identify bridge records associated with bridge nodes configured to connect the network to the partner networks; and
- calculate the one or more detailed metrics by calculating a partner metric for each of the partner networks based on the bridge records, wherein the partner metric represents a subset of the inter-network communications associated with the corresponding partner network.

20. The system of claim 16, wherein the at least one memory further includes the computer executable instructions to calculating the one or more detailed metrics by:
- identifying a protocol for each of the records, wherein the protocol represents a communication technology utilized to facilitate one or more corresponding communication sessions; and
- calculating technology data for each protocol, wherein the technology data represents the communication sessions facilitated by the corresponding communication technology.

\* \* \* \* \*